United States Patent
Lee et al.

(10) Patent No.: US 9,832,668 B2
(45) Date of Patent: *Nov. 28, 2017

(54) METHOD AND APPARATUS FOR MEASURING RADIO RESOURCE USE PER TRAFFIC CLASS IN A WIRELESS COMMUNICATION SYSTEM

(71) Applicant: Samsung Electronics Co., Ltd., Suwon-si, Gyeonggi-do (KR)

(72) Inventors: Neung-Hyung Lee, Seongnam-si (KR); Sung-Oh Kwon, Seoul (KR); Sang-Min Oh, Suwon-si (KR); Ho-Sun Youm, Seoul (KR); Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

This patent is subject to a terminal disclaimer.

(21) Appl. No.: 14/881,997

(22) Filed: Oct. 13, 2015

(65) Prior Publication Data

US 2016/0037362 A1    Feb. 4, 2016

Related U.S. Application Data

(63) Continuation of application No. 12/857,862, filed on Aug. 17, 2010, now Pat. No. 9,191,850.

(30) Foreign Application Priority Data

Aug. 19, 2009 (KR) .................. 10-2009-0076658
Sep. 15, 2009 (KR) .................. 10-2009-0087240
Nov. 9, 2009 (KR) .................. 10-2009-0107357

(51) Int. Cl.
*H04W 24/02* (2009.01)
*H04W 28/08* (2009.01)
(Continued)

(52) U.S. Cl.
CPC .......... *H04W 24/02* (2013.01); *H04W 24/04* (2013.01); *H04W 28/08* (2013.01);
(Continued)

(58) Field of Classification Search
None
See application file for complete search history.

(56) References Cited

U.S. PATENT DOCUMENTS 7,145,895 B2 *  12/2006  Mueckenheim ...... H04L 1/1812
                                                     370/329
RE40,734 E  *   6/2009  Borden ..................... B09C 1/00
                                                     166/296

(Continued)

FOREIGN PATENT DOCUMENTS

EP    0 935 353 A1    8/1999
EP    1 361 769 A1    11/2003

(Continued)

OTHER PUBLICATIONS

R2-094887, 3GPP TSG-RAN WG2 Meeting #67, PRB Usage per Traffic Class Detail Definiton [online], Aug. 18, 2009, Shenzhen, China.

(Continued)

*Primary Examiner* — Bunjob Jaroenchonwanit
(74) *Attorney, Agent, or Firm* — Jefferson IP Law, LLP

(57) ABSTRACT

A method and apparatus for measuring a use of radio resources in a wireless communication system are provided. The method includes allocating radio resources to a plurality of transport blocks, and, if at least one transport block among the plurality of transport blocks overlaps at least one other transport block in terms of the radio resources, a use of the radio resources is measured by calculating a sum of a value determined by dividing the number of radio resources allocated to each of the plurality of transport (Continued)

blocks by the number of radio resources which are used by the at least one other transport block in a duplicate manner.

10 Claims, 5 Drawing Sheets

(51) Int. Cl.
*H04W 72/04* (2009.01)
*H04W 24/04* (2009.01)
*H04W 24/10* (2009.01)
*H04W 72/00* (2009.01)

(52) U.S. Cl.
CPC ........ *H04W 72/0486* (2013.01); *H04W 24/10* (2013.01); *H04W 72/00* (2013.01)

(56) References Cited

U.S. PATENT DOCUMENTS

| | | | | |
|---|---|---|---|---|
| 2002/0080887 | A1* | 6/2002 | Jeong | H04L 1/0041 375/295 |
| 2002/0089952 | A1* | 7/2002 | Cao | H04L 47/10 370/335 |
| 2004/0218606 | A1* | 11/2004 | Leatherbury | H04Q 11/0478 370/395.5 |
| 2006/0143549 | A1* | 6/2006 | Yasumoto | H04L 1/244 714/704 |
| 2007/0060159 | A1* | 3/2007 | Utsunomiya | H04W 72/085 455/450 |
| 2007/0070942 | A1 | 3/2007 | Harris et al. | |
| 2007/0153672 | A1 | 7/2007 | Terry et al. | |
| 2007/0258488 | A1* | 11/2007 | Chang | H04N 7/1675 370/476 |
| 2007/0274339 | A1 | 11/2007 | Kim et al. | |
| 2008/0205370 | A1 | 8/2008 | Bae et al. | |
| 2008/0240030 | A1* | 10/2008 | Kolding | H04L 1/0025 370/329 |
| 2009/0034597 | A1* | 2/2009 | Kobayashi | H04N 17/04 375/224 |
| 2010/0046456 | A1* | 2/2010 | Yi | H04W 72/10 370/329 |
| 2010/0208673 | A1* | 8/2010 | Nam | H04W 72/06 370/329 |
| 2011/0038431 | A1 | 2/2011 | Frederiksen et al. | |
| 2011/0134871 | A1* | 6/2011 | Nogami | H04L 5/0044 370/329 |
| 2012/0163319 | A1* | 6/2012 | Roessel | H04L 1/0003 370/329 |
| 2012/0163437 | A1* | 6/2012 | Frederiksen | H04L 5/001 375/224 |

FOREIGN PATENT DOCUMENTS

| | | |
|---|---|---|
| KR | 10-2002-0077817 A | 10/2002 |
| KR | 10-2008-0080669 A | 9/2008 |
| KR | 10-2008-0111308 A | 12/2008 |
| WO | 20071079058 A2 | 7/2007 |
| WO | 2008/026867 A1 | 3/2008 |
| WO | 2008/156275 A3 | 12/2008 |
| WO | 2009/041770 A2 | 4/2009 |
| WO | 2009/073343 A1 | 6/2009 |

OTHER PUBLICATIONS

R2-094888, 3GPP TSG-RAN WG2 Meeting #67, Correction to the Definition of PRB Usage per Traffic Class to Taking into Account Multiple Antenna Transmission [online], Aug. 18, 2009, Shenzhen, China.

3rd Generation Partnership Project; Technical Specification Group Radio Access Network; Evolved Universal Terrestrial Radio Access (E-UTRA); Layer 2—Measurements (Release 8), 3GPP TS 36.314, Jun. 2009, pp. 1-15, V8.2.0, 3GPP, Valbonne, France.

* cited by examiner

US 9,832,668 B2

METHOD AND APPARATUS FOR MEASURING RADIO RESOURCE USE PER TRAFFIC CLASS IN A WIRELESS COMMUNICATION SYSTEM

PRIORITY

This application is a continuation application of prior application Ser. No. 12/857,862, filed on Aug. 17, 2010, and claims the benefit under 35 U.S.C. §119(a) of a Korean patent application filed in the Korean Intellectual Property Office on Aug. 19, 2009 and assigned Serial No. 10-2009-0076658, a Korean patent application filed in the Korean Intellectual Property Office on Sep. 15, 2009 and assigned Serial No. 10-2009-0087240, and a Korean patent application filed in the Korean Intellectual Property Office on Nov. 9, 2009 and assigned Serial No. 10-2009-0107357, the entire disclosure of each of which is hereby incorporated by reference.

BACKGROUND OF THE INVENTION

1. Field of the Invention

The present invention relates to a method and apparatus for measuring a use of radio resources in a wireless communication system. More particularly, the present invention relates to a method and apparatus for measuring a use of radio resources per traffic class.

2. Description of the Related Art

In the $3^{rd}$ Generation Partnership Project (3GPP), which is responsible for standardizing the Universal Mobile Telecommunications System (UMTS), a Long Term Evolution (LTE) system is now under development as the next-generation mobile communication system for the UMTS system. LTE is a technology that realizes high-speed packet-based communications at a full data rate of about 100 Mbps, which is aimed to be commercialized in 2010. The Institute of Electrical and Electronics Engineers (IEEE) Technical Standard (TS) 36.314, which is a 3GPP Radio Access Network 2 (RAN2) standard, describes a method for measuring a Physical Resource Block (PRB) use among methods for measuring the use of radio resources in the LTE system. The use of PRBs, which is information used for inter-cell load balancing and Call Admission Control (CAC) in the LTE system, denotes the use of time and/or frequency resources. Thus, for the inter-cell load balancing, the PRB use should be accurately measured. Generally however, in the LTE system, a transport block includes a part other than the actual data, such as padding, and the PRB use measured by the conventional approach defined in TS 36.314 is calculated without considering the part other than the actual data, i.e., even the part other than the actual data in the transport block is proportionally calculated in the calculation process of PRB use, thus making it impossible to represent the exact load of the system.

In addition, the development of the LTE system up to now has not taken into consideration a multi-antenna technology for measurement of the PRB use. Therefore, if the multi-antenna technology is applied to the existing LTE system, different transport blocks may share the same PRB. In this case, a PRB use per traffic class (which is equivalent to Quality of service Class Identifier (QCI)) may be calculated as a value of 100% or more, even though its maximum value is defined as 100%.

In the LTE system, information about the PRB use may be exchanged between cells for load balancing. Assuming that for load balancing, the PRB use information is exchanged between cells and one cell supports a single antenna while another cell supports multiple antennas, PRB uses having the same value may actually indicate that the loads are at different levels. A description of such an occurrence will be given with reference to FIG. 1.

FIG. 1 illustrates the use of PRBs in transport blocks in a conventional multi-antenna system, in which a plurality of transport blocks sharing PRBs are transmitted via multiple antennas. For convenience, it is assumed that in the example of FIG. 1, one QCI belongs to each of transport blocks 101, 103 and 105, and the number of bits of padding and a MAC subheader is 0. In FIG. 1, since the transport block #0 101 uses PRB #0 and PRB #1 100%, its PRB use becomes 2, and in the same manner, a PRB use of the transport block #1 103 becomes 2, and a PRB use of the transport block #2 105 becomes 3. In the example of FIG. 1, since the total number of PRBs used is 4 (PRBs #0~#3) and a sum of the number of PRBs used by the transport blocks #0~#2 becomes 7, the total PRB use becomes 7/4*100=175%. Therefore, the conventional approach fails to accurately reflect the load of the multi-antenna system.

To address these and other drawbacks, a new approach is required that can better represent the actual load of the system considering the part other than the actual data in a transport block during measurement of radio resource use in the wireless communication system, and can accurately represent the load even when the multi-antenna technology is applied.

SUMMARY OF THE INVENTION

An aspect of the present invention is to address at least the above-mentioned problems and/or disadvantages and to provide at least the advantages described below. Accordingly, an aspect of the present invention is to provide a method and apparatus for accurately measuring the use of radio resources in a wireless communication system.

Another aspect of the present invention is to provide a method and apparatus for accurately measuring a use of radio resources considering a part other than the actual data in a transport block in a wireless communication system.

Further another aspect of the present invention is to provide a method and apparatus for accurately measuring a use of radio resources in a wireless communication system using multiple antennas.

Yet another aspect of the present invention is to provide a method and apparatus capable of measuring the actual load during calculation of a radio resource use per traffic class in a wireless communication system.

In accordance with an aspect of the present invention, a method for measuring a use of radio resources in a wireless communication system is provided. The method includes allocating radio resources to a plurality of transport blocks, and, if at least one transport block among the plurality of transport blocks overlaps at least one other transport block in terms of the radio resources, measuring a use of the radio resources by calculating a sum of a value determined by dividing the number of radio resources allocated to each of the plurality of transport blocks by the number of radio resources that are used by the at least one other transport block in a duplicate manner.

In accordance with another aspect of the present invention, an apparatus for measuring a use of radio resources in a wireless communication system is provided. The apparatus includes a Medium Access Control (MAC) layer processor for allocating radio resources to a plurality of transport blocks, and, if at least one transport block among the plurality of transport blocks overlaps at least one other transport block in terms of the radio resources, for measuring a use of the radio resources by calculating a sum of a value determined by dividing the number of radio resources allocated to each of the plurality of transport blocks by the number of radio resources that are used by the at least one other transport block in a duplicate manner.

In accordance with further another aspect of the present invention, a method for measuring a use of radio resources in a wireless communication system is provided. The method includes allocating radio resources to a transport block according to a traffic class, and measuring a use of the radio resources after excluding a part other than data from the transport block, for each traffic class.

In accordance with yet another aspect of the present invention, an apparatus for measuring a use of radio resources in a wireless communication system is provided. The apparatus includes a Medium Access Control (MAC) layer processor for allocating radio resources to a transport block according to a traffic class, and for measuring a use of the radio resources after excluding a part other than data from the transport block, for each traffic class.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In an exemplary embodiment of the present invention described below, a wireless communication system will be assumed to be a Long Term Evolution (LTE) system. However, a method for measuring a use of radio resources according to the present invention may be applied in substantially the same way to other mobile communication systems using similar measurement methods.

Figure 2:
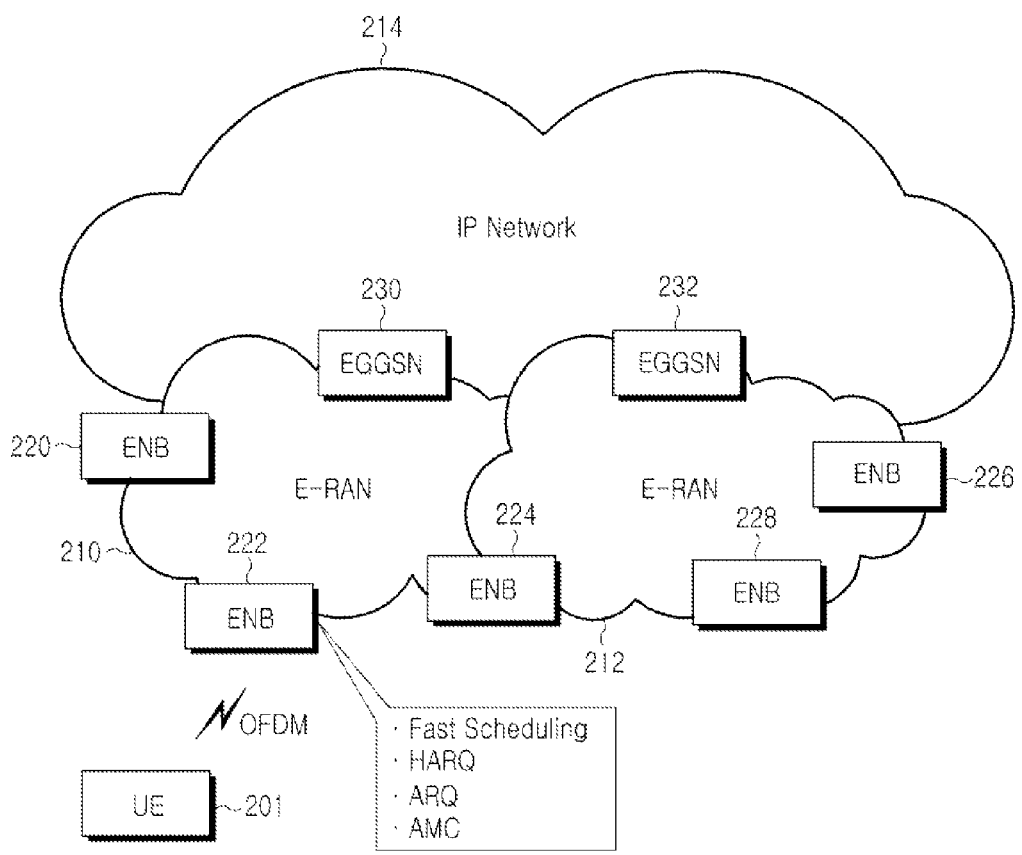
FIG. 2 illustrates an LTE mobile communication system according to an exemplary embodiment of the present invention.

FIG. 2 illustrates an LTE mobile communication system according to an exemplary embodiment of the present invention.

Referring to FIG. 2, Evolved Radio Access Networks (E-RANs) 210 and 212 are simplified to a 2-layer structure consisting of evolved Node Bs (eNBs) 220, 222, 224, 226 and 228, and upper nodes (also known as access gateways) 230 and 232. A User Equipment (UE) 201 accesses an Internet Protocol (IP) network 214 by means of the E-RANs 210 and 212. The eNBs 220 to 228 correspond to the existing Node Bs in the Universal Mobile Telecommunications System (UMTS). The eNB is connected to the UE 201 over a wireless channel, and performs a more complicated operation than the existing Node B.

In the LTE system, since all user traffic, including real-time services such as Voice over IP (VoIP), are served over a shared channel, an apparatus is required that performs scheduling by collecting status information of UEs. In the LTE system, the eNBs 220 to 228 are in charge of the scheduling. Commonly, one eNB controls a plurality of cells. To realize the full data rate of 100 Mbps, the LTE system uses Orthogonal Frequency Division Multiplexing (OFDM) as its wireless access technology in its maximum bandwidth of 20 MHz. In addition, the LTE system employs Adaptive Modulation & Coding (AMC) that adaptively determines a modulation scheme and a channel coding rate depending on the channel status of the UEs.

In accordance with an exemplary embodiment of the present invention, each of the eNBs 220 to 228 measures a use of radio resources, or a use of a Physical Resource Block (PRB), considering a part other than the actual data in a transport block. In addition, each of the eNBs 220 to 228, if using multiple antennas, measures a use of a PRB considering the multiple antennas. Based on the measurement results of the PRB use, each of the eNBs 220 to 228 performs inter-cell load balancing. In an exemplary implementation, each eNB may perform inter-cell load balancing by exchanging the measurement results on the PRB use with at least one other eNB. In addition, each of the eNBs 220 to 228 performs Call Admission Control (CAC) according to the measurement results of the PRB use. In an alternative exemplary embodiment of the present invention, the measurement results of the PRB use by the eNBs 220 to 228 may be transmitted to a server (not shown), enabling the server to adjust the inter-cell loads of the eNBs 220 to 228.

Each of the eNBs 220 to 228 includes means for processing a Medium Access Control (MAC) layer, a Radio Link Control (RLC) layer, and a Physical (PHY) layer. The means for processing the MAC, RLC and PHY layers is involved in a measurement operation of the PRB use. The means for processing the MAC layer includes a MAC scheduler for measuring a PRB use according to an exemplary embodiment of the present invention. The MAC layer schedules resources for a UE while monitoring its channel status, and makes a transport block according to the scheduling results. In a downlink, the MAC layer sends the RLC layer information about the amount of transmission data for each Logical Channel (LCH) according to the size of the transport block. The RLC layer makes at least one MAC Service Data Unit (SDU) depending on the information about the amount of transmission data for each LCH, and sends it to the MAC layer. The MAC layer generates a MAC Protocol Data Unit (PDU) by multiplexing the received at least one MAC SDU. In an uplink, a MAC layer in an eNB transmits transport block information to a UE using an uplink grant, and a MAC layer and an RLC layer in the UE perform multiplexing for each LCH and transmit a transport block to the eNB. Then, in the MAC layer of the eNB, a MAC scheduler calculates a PRB use for the transport block that has been successfully received from the UE.

Now, an exemplary method for measuring a PRB use in an eNB will be described in more detail. First, for a better understanding, a related method of measuring PRB use by an eNB of the LTE system will be described below, a mathematical definition of which is given by Equations (1) and (2).

$$M(qci) = \left\lfloor \frac{M1(qci, T)}{P(T)} * 100 \right\rfloor \quad (1)$$

Definitions of parameters in Equation (1) are made as follows:
M(qci): a percentage of PRB use per traffic class
T: a period for which PRB use is measured
P(T): the total number of PRBs available for the period T
In Equation (1), M1(qci,T) denotes a PRB use per traffic class, which is calculated using Equation (2).

$$M1(qci, T) = \sum_{\forall t} N(t) * X(t) * \frac{B(t, qci)}{B(t)}. \quad (2)$$

Definitions of parameters in Equation (2) are given as follows:
M1(qci,T): PRB use per traffic class
t: a transport block that includes Dedicated Traffic Channel (DTCH) data for the period T
N(t): the number of PRBs used for the transport block #t
B(t, qci): the total number of bits for a DTCH, a traffic class of which is qci, and which is transmitted through the transport block #t.
B(t): the total number of a DTCH and a Dedicated Control Channel (DCCH), which are transmitted through the transport block #t
X(t): has a value of "1" if a transport block is transmitted through multiplexing, i.e., concatenation is performed, and otherwise has a value of "0".

The related method for calculating a PRB use for one transport block will be described below with reference to FIG. 3.

Figure 3:
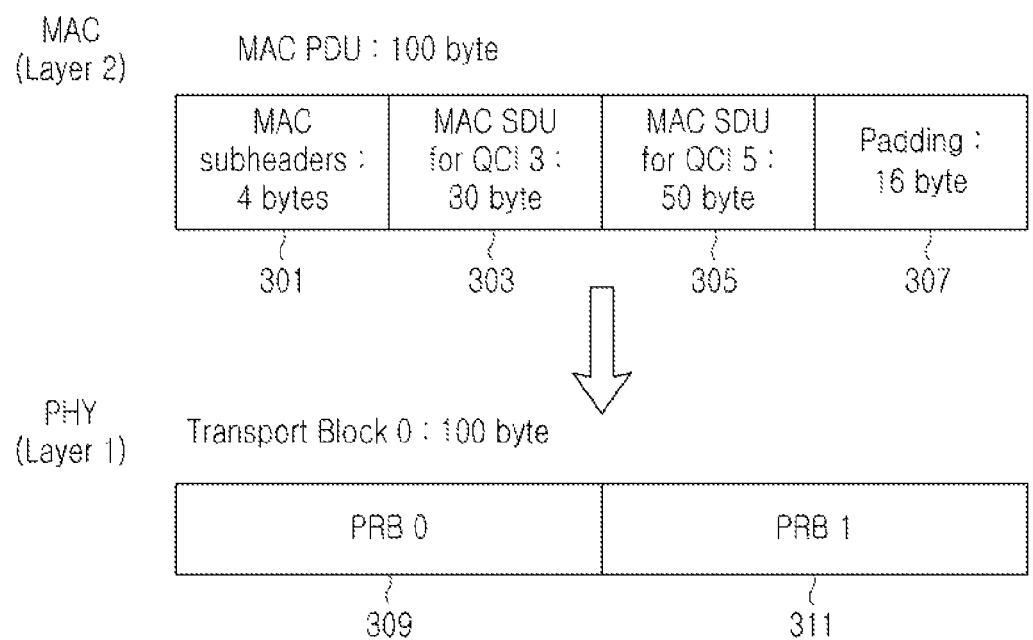
FIG. 3 illustrates a transport block and a Medium Access Control (MAC) Packet Data Unit (PDU) according to an exemplary embodiment of the present invention.

FIG. 3 illustrates a transport block and a MAC PDU according to an exemplary embodiment of the present invention.

For sake of convenience, it is assumed that a transport block #0 includes two PRBs: a PRB #0 309 and a PRB #1 311, and a size of the transport block #0, which is calculated considering the channel condition, is 100 bytes. Also, it is assumed that a MAC layer in an eNB makes a MAC PDU, which does not exceed 100 bytes, by multiplexing LCHs for QCI 3 and QCI 5, and as a result, the generated MAC PDU has a 4-byte MAC subheader 301, a 30-byte LCH 303 for QCI 3, a 50-byte LCH 305 for QCU 5, and a 16-byte padding 307.

Under this assumption, PRB use per traffic class, M1(qci, T), is calculated as follows, using Equation (2):
PRB use for QCI 3: 30/(30+50)*2=0.75
PRB use for QCI 5: 50/(30+50)*2=1.25

Although it is provided in Equation (2) that PRB use for all transport blocks should be added for each QCI, PRB use in the two PRBs 309 and 311 occupied by the transport block #0 will be considered in FIG. 3. Accordingly, a sum of the PRB use for QCI 3 and the PRB use for QCI 5 becomes 2 (=0.75+1.25), so it is determined that the two PRBs occupied by the transport block #0 are used 100%. However, this measurement result does not accurately represent the load, since only the MAC SDUs for each QCI were considered during calculation of the PRB use and a part other than the actual data, such as padding, was not considered. In other words, in the example of FIG. 3, since the amount of data transmittable in the physical layer is 100 bytes and the amount of actually transmitted data is 80 bytes, the current load is not 100% but 80%, which means that the existing method cannot correctly measure the PRB use. Therefore, for accurate load balancing, the existing PRB use measurement method needs to be modified to represent the actual load.

The present invention proposes the following four exemplary methods for measuring a PRB use per traffic class.

In a first exemplary method, a part other than the data, such as padding, is excluded from a transport block #t during calculation of a PRB use per QCI of the transport block #t.

In a second exemplary method, if the same PRB is shared by another transport block during calculation of a PRB use per QCI of a transport block #t, the shared PRB is divided in a specific ratio during the calculation. A plurality of different transport blocks may share a PRB in, for example, a multi-antenna system.

In a third exemplary method, if the same PRB is used in a duplicate manner, or shared, by different transport blocks during calculation of the number of available PRBs, the number of available PRBs is added by the number of the duplicate uses. Likewise, a plurality of different transport blocks may share a PRB in, for example, a multi-antenna system.

In a fourth exemplary method, the total PRB use is multiplied by a ratio of the number of bits of a transport block transmitted for each QCI to the number of bits of all transport blocks. In this manner, a PRB use per QCI may be measured in any wireless communication systems, including the multi-antenna system.

In accordance with exemplary embodiments of the present invention, the four different exemplary modified PRB use measurement methods may be realized as the below-described first to eighth exemplary embodiments of the present invention, and these exemplary embodiments will be described with reference to FIGS. 1 to 3.

Exemplary Embodiment 1

In Equation (2) for calculating a PRB use per traffic class, the parameter B(t) is modified to the total number of bits transmitted in a transmit block t, or to a size of the transport block.

If the definition of the parameter B(t) is modified in this way, the PRB use is calculated as follows:

PRB use for QCI 3: 30/100*2=0.6
PRB use for QCI 5: 50/100*2=1.0

In accordance with Exemplary Embodiment 1, the number of bits used for the padding and the MAC subheader in the transport block #t is excluded during calculation of the PRB use, so a ratio of the actual data is calculated. That is, it can be noted in Exemplary Embodiment 1 that as the ratio 80% of the transmitted actual data in the total two PRBs is applied, it is determined that 1.6 PRBs, indicative of an effective PRB use, are in use.

Exemplary Embodiment 2

In Equation (2) for calculating a PRB use per traffic class, the parameter B(t) is modified to a size of a transport block #1, and the parameter B(t, qci) is modified to a sum of the total number of bits for a DTCH, a traffic class of which is QCI, and which is transmitted in the transport block #t, and the number of bits used for a MAC subheader belong to the QCI.

If the definitions of the parameters B(t) and B(t, qci) are made in this way, the PRB use calculation method is modified as follows:

PRB use for QCI 3: (30+2)/100*2=0.64
PRB use for QCI 5: (50+2)/100*2=1.04

In Exemplary Embodiment 2, a length of the MAC subheader is involved in the PRB use. There are some MAC subheaders, which, though not actual data, can be distinguished according to the traffic class, as they are added during transmission of a DTCH. Considering this, in Exemplary Embodiment 2, a 2-byte MAC subheader is added to the PRB use in each of QCI 3 and QCI 5 during calculation of the PRB use per traffic class.

Exemplary Embodiment 3

In Equation (2) for calculating a PRB use per traffic class, the parameter B(t) is modified to a size of a transport block #1, and the parameter B(t, qci) is modified to a sum of the total number of bits for a DTCH, a traffic class of which is QCI, and which is transmitted in the transport block #1, and the number of bits, which corresponds to a specific ratio of the total number of bits used for a MAC subheader. Exemplary Embodiment 3 calculates the actual number of bits per QCI by adding a specific ratio of the total number of bits of a MAC subheader to the PRB use, rather than calculating the actual number of bits per QCI by adding the number of bits of a MAC subheader to the PRB use as in Exemplary Embodiment 2.

If the definitions of the parameters B(t) and B(t, qci) are modified in this way and the specific ratio is defined as, for example, a ratio of the number of bits for a DTCH per QCI, the PRB use calculation method is modified as follows:

PRB use for QCI 3: (30+4*30/(30+50))/100*2=0.63
PRB use for QCI 5: (50+4*50/(30+50))/100*2=1.05

Although the specific ratio is defined as, for example, a ratio of the number of bits for a DTCH per QCI in Exemplary Embodiment 3, the specific ratio may be modified in various ways so that the number of bits of a MAC subheader may be considered during calculation of the PRB use.

Exemplary Embodiment 4

In Equation (2) for calculating a PRB use per traffic class, the number N(t) of PRBs used for a transport block #1 is modified to a value normalized using Equation (3).

$$\sum_{\forall p \in S(t)} \frac{1}{W(p)} \quad (3)$$

Definitions of parameters in Equation (3) are given as follows:

S(t): a set of PRBs used for a transport block #t
W(p): the number of transport blocks using a PRB #p.

In Exemplary Embodiment 4, the number of PRBs used for the transport block #t is normalized considering multi-antenna transmissions. N(t) normalized using Equation (3) denotes a value determined by calculating (1/'the number of transport blocks using the PRB') for each PRB belonging to the transport block #t, and then summing all the calculated values. For example, if n transport blocks use the same PRB, it is calculated that the PRB is used by 1/n in each transport block. Therefore, in the example of FIG. 1, the PRB use calculation method is modified as follows:

PRB use for a transport block #0: (1+⅓)=1.33
PRB use for a transport block #1: (⅓+½)=0.83
PRB use for a transport block #2: (⅓+½+1)=1.83

Figure 1:
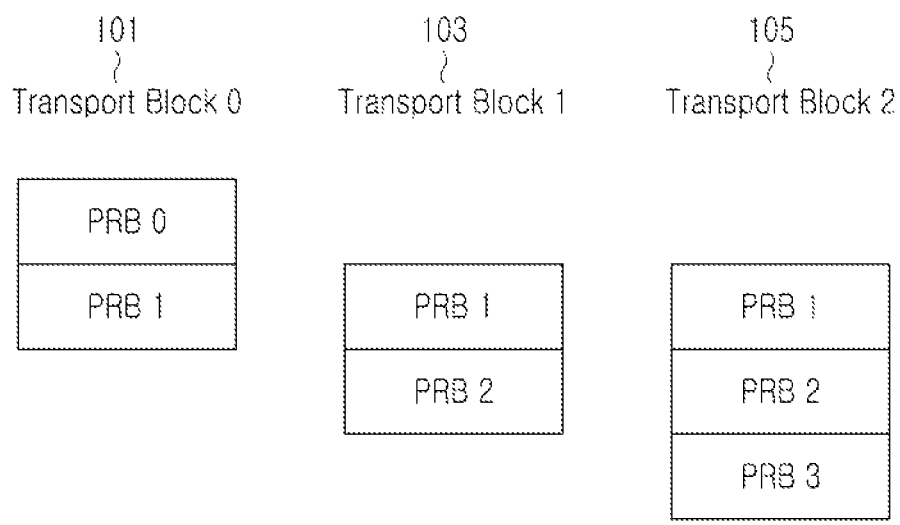
FIG. 1 illustrates transport blocks in a conventional multi-antenna system.

In the example of FIG. 1, a percentage of a PRB use per traffic class calculated for four PRBs (PRBs #0~#3) is (1.33+0.83+1.83)/4*100=100%.

Exemplary Embodiment 5

Exemplary Embodiment 5 is an approach to calculating a PRB use per traffic class by combining Exemplary Embodiment 4 with any one of Exemplary Embodiments 1, 2 and 3. For example, assuming that transport blocks #0, #1 and #2 use PRBs as in the example of FIG. 1 and each of the transport blocks transmits a MAC PDU in the form given in FIG. 3, if Exemplary Embodiment 4 and Exemplary Embodiment 1 are applied together, a PRB use for each QCI in every transport block and a PRB use for each QCI are calculated as follows:

<PRB Use for Each QCI in Every Transport Block>
PRB use for QCI 3 in the transport block #0: 30/100*(1+⅓)=0.399
PRB use for QCI 5 in the transport block #0: 50/100*(1+⅓)=0.665
PRB use for QCI 3 in the transport block #1: 30/100*(⅓+½)=0.249
PRB use for QCI 5 in the transport block #1: 50/100*(⅓+½)=0.415
PRB use for QCI 3 in the transport block #2: 30/100*(⅓+½+1)=0.549
PRB use for QCI 5 in the transport block #2: 50/100*(⅓+½+1)=0.615

<PRB Use for Each QCI>
PRB use for QCI 3: 0.399+0.249+0.549=1.197
PRB use for QCI 5: 0.665+0.415+0.615=1.695

In accordance with Exemplary Embodiment 5, a PRB use occupied by QCI 3 and QCI 5 among four PRBs is calculated as (1.197+1.695)/4*100=72.3%.

Exemplary Embodiment 6

In Equation (1) for calculating a PRB use per traffic class, P(T) that does not consider multi-antenna transmissions is modified to P'(T) using Equation (4) below. In Equation (4), P'(T) denotes the total number of PRBs available for a period T, when multi-antenna transmissions are considered.

$$P'(T)=P(T)+A(T) \quad (4)$$

Definitions of parameters in Equation (4) are given as follows:

P(T): the total number of PRBs available for a period T when multi-antenna transmissions are not considered A(T): the number of PRBs additionally used in a duplicate manner for a period T when multi-antenna transmissions are considered Exemplary Embodiment 6 is an approach to calculating the total number of PRBs available for a period T by adding the number of PRBs additionally used in a duplicate manner when multi-antenna transmissions are considered, to the total number of PRBs available when multi-antenna transmissions are not considered. Thereafter, in the example of FIG. 1, the PRB use calculation method is modified as follows:

PRB use of the transport block #0: 2
PRB use of the transport block #1: 2
PRB use of the transport block #2: 3

Because the number of PRBs available when multi-antenna transmissions are not used, is 4, and the number of PRBs additionally used in a duplicate manner due to their sharing by multiple antennas is 2 for a PRB #1 and 1 for a PRB #2, the total number of PRBs available when multi-antenna transmissions are considered, is (4+2+1)=7. Therefore, in accordance with exemplary embodiments of the present invention, if Equation (4) is applied to Equation (1), a percentage of a PRB use per traffic class calculated for four PRBs (PRB #0~#3) is (2+2+3)/(4+2+1)*100=100%.

Exemplary Embodiment 7

Exemplary Embodiment 7 is an approach to calculating a PRB use per traffic class by combining Exemplary Embodiment 6 with any one of Exemplary Embodiments 1, 2 and 3. For example, assuming that transport blocks #0, #1 and #2 use PRBs as in the example of FIG. 1 and each of the transport blocks transmits a MAC PDU in the form given in FIG. 3, if Exemplary Embodiment 6 and Exemplary Embodiment 1 are applied together, a PRB use for each QCI in every transport block and a PRB use for each QCI are calculated as follows:

<PRB Use for Each QCI in Every Transport Block>
PRB use for QCI 3 in the transport block #0: 30/100*2=0.6
PRB use for QCI 5 in the transport block #0: 50/100*2=1.0
PRB use for QCI 3 in the transport block #1: 30/100*2=0.6
PRB use for QCI 5 in the transport block #1: 50/100*2=1.0
PRB use for QCI 3 in the transport block #2: 30/100*3=0.9
PRB use for QCI 5 in the transport block #2: 50/100*3=1.5

<PRB Use for Each QCI>
PRB use for QCI 3: 0.6+0.6+0.9=2.0
PRB use for QCI 5: 1.0+1.0+1.5=3.5

In accordance with Exemplary Embodiment 7, since the number of PRBs available when multi-antenna transmissions are not used, is 4, and the number of PRBs additionally used in a duplicate manner due to their sharing by multiple antennas is 2 for a PRB #1 and 1 for a PRB #2, the total number of PRBs available when multi-antenna transmissions are considered, is (4+2+1)=7. Of the total, a PRB use occupied by QCI 3 and QCI 5 is (2.0+3.5)/(4+2+1)*100=78.57%.

Exemplary Embodiment 8

In this exemplary embodiment, Equations (1) and (2) for calculating a PRB use per traffic class are modified to Equations (5) and (6), respectively.

$$M(qci) = \lfloor M1(qci, T) \times M(T) \rfloor \quad (5)$$

$$M1(qci, T) = \sum_{\forall t} X(t) * \frac{B(t, qci)}{\sum_{\forall t'} B(t')} \quad (6)$$

Definitions of parameters in Equations (5) and (6) are given as follows:

M1(qci, T): PRB use ratio per traffic class
M(T): the total PRB use, which is measured using Equation (7) below.
t, t': a transport block(s) that includes DTCH data for a period T
B(t, qci): the total number of bits for a DTCH, a traffic class of which is qci, and which is transmitted through the transport block #t.
B(t'): the total number of bits for a DTCH and a DCCH, which are transmitted through a transport block #t'.
X(t): has a value of "1" if a transport block is transmitted through multiplexing, i.e., concatenation is performed, and otherwise has a value of "0".

$$M(T) = \left\lfloor \frac{M1(T)}{P(T)} * 100 \right\rfloor \quad (7)$$

Definitions of parameters in Equation (7) are given as follows:

M1(T): the number of PRBs used for a period T
P(T): the total number of PRBs available for a period T Exemplary Embodiment 8 is an approach to measuring a PRB use per QCI through Equation (5) by measuring a ratio of the number of bits of a transport block transmitted for each QCI to the number of bits of all transport blocks using Equation (6), and then multiplying the ratio by the total PRB use. The total PRB use is calculated in accordance with Equation (7). For example, if it is assumed that transport blocks #0, #1 and #2 use PRBs as in the example of FIG. 1 and each of the transport blocks transmits a MAC PDU in the form given in FIG. 3, then a PRB use for each QCI is calculated as follows:

the total PRB use: 100%
PRB use ratio for QCI 3: (30+30+30)/(100+100+100)=0.3
PRB use ratio for QCI 5: (50+50+50)/(100+100+100)=0.5
PRB use for QCI 3: 0.3*100=30%
PRB use for QCI 5: 0.3*100=30%

This exemplary embodiment is characterized by calculating a PRB use ratio based on a transmission ratio for the relevant QCI in all transport blocks regardless of the use of multiple antennas.

Figure 4:
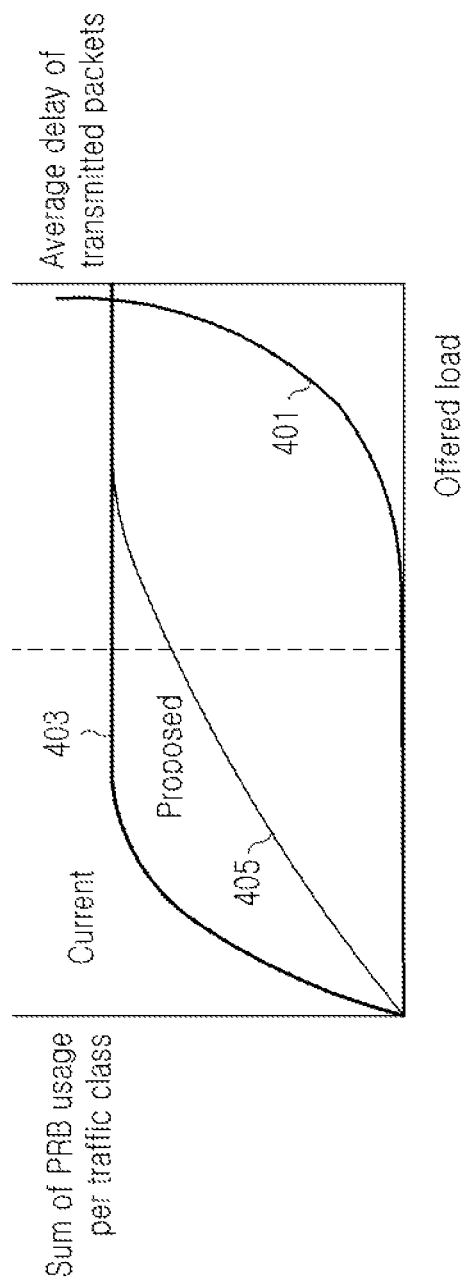
FIG. 4 is a graph showing the simulation results on measurement of a Physical Resource Block (PRB) use according to an exemplary embodiment of the present invention.

FIG. 4 is a graph showing the simulation results on measurement of a PRB use according to an exemplary embodiment of the present invention, which represents a relationship between a sum of PRB use per traffic class and an average delay of transmitted packets depending on a load 401 offered to the cell.

In accordance with the conventional PRB use measurement method, if a MAC PDU is generated by including padding in a transport block at a low offered load 401, a PRB use of the transport block becomes 100%. Therefore, a sum of PRB use per traffic class fast increases with the offered load 401, thus reaching 100%. In conclusion, in the conventional measurement method, as there are more services in which an average traffic data rate is low but packets occur frequently, the PRB use is measured to reach the point of 100% faster as represented by a curve 403. In this case, since the actually offered load is low even though the measurement result on the PRB use has reached 100%, an average delay of the actually transmitted packets is very low. On the other hand, in accordance with the PRB use measurement method according to exemplary embodiments of the present invention, it can be noted that the actually offered load 401 may be accurately reflected in the measurement result regardless of the traffic pattern of the service, and the measurement result on the PRB use reaches 100% at the time an average delay of transmitted packets increases as shown by a curve 405. With use of the PRB use measurement method proposed by exemplary embodiments of the present invention, an eNB may acquire accurate load information necessary for inter-cell load balancing and CAC.

Figure 5:
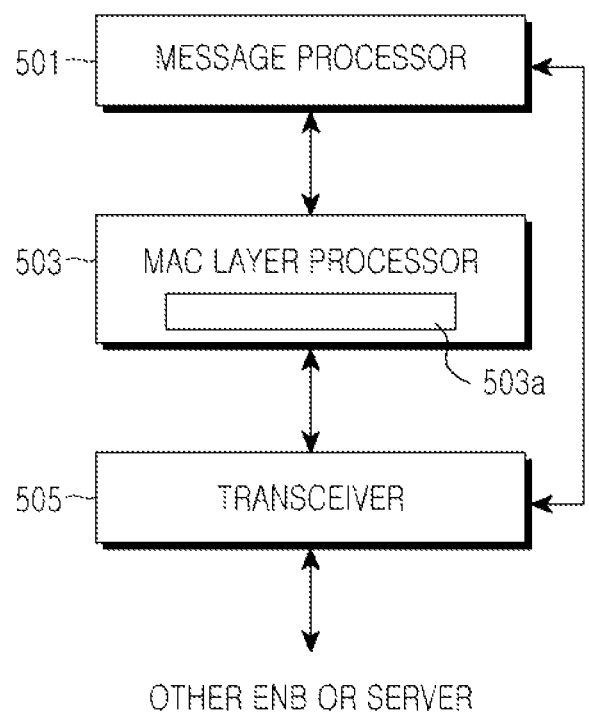
FIG. 5 illustrates an evolved Node B (eNB) for measuring a use of radio resources according to an exemplary embodiment of the present invention.

FIG. 5 shows a structure of an eNB for measuring a use of radio resources according to an exemplary embodiment of the present invention.

Referring to FIG. 5, a base station, or an eNB, according to an exemplary embodiment of the present invention includes a message processor 501, a MAC layer processor 503, and a transceiver 505. The message processor 501 and the transceiver 505 are included for inter-cell load balancing through a message exchange with another eNB or server, and measurement of a PRB use is performed by the MAC layer processor 503.

When performing inter-cell load balancing by exchanging the measurement result of PRB use with at least one other eNB, the message processor 501 receives the measurement result on the PRB use provided from the MAC layer processor 503, generates a message including the measurement result, and delivers the message to the transceiver 505. The message processor 501 receives a message including the measurement result on a PRB use from the at least one other eNB through the transceiver 505, and delivers the received measurement result to the MAC layer processor 503.

The MAC layer processor 503 includes a MAC scheduler 503a that measures a PRB use as a use of radio resources by applying at least one of the first to eighth exemplary embodiments of the present invention. The MAC scheduler 503a performs inter-cell load balancing and/or CAC using the PRB use measured in its eNB. The inter-cell load balancing and CAC may be performed under the control of a controller (not shown). In an alternative exemplary embodiment, if the measurement results on the PRB uses of eNBs are transmitted to a server (not shown), the server may be adapted to adjust the inter-cell load of the eNBs.

The transceiver 505 exchanges messages including the measurement results of the PRB uses with at least one other eNB, or transmits messages including the measurement results of the PRB uses to the server.

As is apparent from the foregoing description, exemplary embodiments of the present invention can accurately measure a use of radio resources in a wireless communication system.

In addition, exemplary embodiments of the present invention can accurately measure a use of radio resources considering a part other than the actual data in a transport block in a wireless communication system.

Besides, exemplary embodiments of the present invention can accurately measure a use of radio resources in a wireless communication system using multiple antennas.

Furthermore, exemplary embodiments of the present invention can measure the actual load during calculation of a use of radio resources per traffic class in a wireless communication system.

With use of the PRB use measurement method, an eNB can acquire the accurate load information necessary for inter-cell load balancing and CAC.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a load balancing by a base station in a wireless communication system, the method comprising:
   performing, by the base station, a first operation of identifying a set of physical resource block (PRB)s used for transmission of one transport block;
   performing, by the base station, a second operation of obtaining a first value based on a number of transport blocks that are sharing each PRB in the set of PRBs;
   performing, by the base station, a third operation of obtaining a second value for the one transport block by adding up the first value obtained for each PRB in the set of PRBs;
   performing, by the base station, the first, second, and third operations for at least one remaining transport block;
   obtaining, by the base station, a usage of the PRBs based on the second value for the one transport block and a third value for the at least one remaining transport block; and
   performing, by the base station, a load balancing based on the usage of the PRBs.

2. The method of claim 1, wherein the obtained usage of the PRBs is defined based on, $$\sum_{\forall p \in S(t)} \frac{1}{W(p)},$$

where S(t) is a set of PRBs used for the one transport block, and W(p) is a number of at least one transport block that is sharing each PRB in the set of PRBs.

3. The method of claim 1, wherein the number of the first value is equal to the number of the at least one PRB.

4. The method of claim 1, wherein the usage of the PRBs per a traffic class is defined based on, $$M1(qci, T) = \sum_{\forall t} N(t) * X(t) * \frac{B(t, qci)}{B(t)},$$

where M1 (qci,T) indicates the usage of the PRBs per the traffic class;
   t indicates one transport block that includes dedicated traffic channel, DTCH, data for a period T;
   N(t) indicates the obtained usage of the PRBs for the one transport block;
   B(t, qci) indicates the total number of bits for a DTCH, a traffic class of which is qci, and which is transmitted through the one transport block;

B(t) indicates the total number of a DTCH and a dedicated control channel, DCCH, which are transmitted through the one transport block;

X(t) has a value of "1" if a transport block is transmitted through multiplexing, and otherwise, X(t) has a value of "0"; and $$\sum_{\forall t}$$

indicates a summation value for the at least one remaining transport block.

5. The method of claim 1, wherein the usage of the PRBs per a traffic class is defined based on the usage of the PRBs for the one transport block and the at least one remaining transport block and an indication for indicating whether the one transport block is transmitted through multiplexing.

6. An apparatus for performing a load balancing by a base station in a wireless communication system, the apparatus comprising:
a processor; and
a memory electrically connected to the processor,
wherein the processor is configured to:
perform a first operation of identifying a set of physical resource block (PRB)s used for transmission of one transport block,
perform a second operation of a first value based on a number of transport blocks that are sharing each PRB in the set of PRBs,
perform a third operation of obtaining a second value for the one transport block by adding up the first value obtained for each PRB in the set of PRBs,
perform the first, second, and third operations for at least one remaining transport block,
obtain a usage of the PRBs based on the second value for the one transport block and a third value for the at least one remaining transport block, and
perform a load balancing based on the usage of the PRBs.

7. The apparatus of claim 6, wherein the obtained usage of the PRBs is defined based on, $$\sum_{\forall p \in S(t)} \frac{1}{W(p)},$$

where S(t) is a set of PRBs used for the one transport block, and W(p) is a number of at least one transport block that is sharing each PRB in the set of PRBs.

8. The apparatus of claim 6, wherein the number of the first value is equal to the number of the at least one PRB.

9. The apparatus of claim 6, wherein the usage of the PRBs per a traffic class is defined based on, $$M1(qci, T) = \sum_{\forall t} N(t) * X(t) * \frac{B(t, qci)}{B(t)},$$

where M1 (qci,T) indicates the usage of the PRBs per the traffic class;

t indicates one transport block that includes dedicated traffic channel, DTCH, data for a period T;

N(t) indicates the obtained usage of the PRBs for the one transport block;

B(t, qci) indicates the total number of bits for a DTCH, a traffic class of which is qci, and which is transmitted through the one transport block;

B(t) indicates the total number of a DTCH and a dedicated control channel, DCCH, which are transmitted through the one transport block;

X(t) has a value of "1" if a transport block is transmitted through multiplexing, and otherwise, X(t) has a value of "0"; and $$\sum_{\forall t}$$

indicates a summation value for the at least one remaining transport block.

10. The apparatus of claim 6, wherein the usage of the PRBs per a traffic class is defined based on the usage of the PRBs for the one transport block and the at least one remaining transport block and an indication for indicating whether the one transport block is transmitted through multiplexing.

* * * * *